(12) United States Patent
 Jackson

(10) Patent No.: US 9,466,221 B2
(45) Date of Patent: Oct. 11, 2016

(54) PRESENTATION CAPTURE DEVICE AND METHOD FOR SIMULTANEOUSLY CAPTURING MEDIA OF A LIVE PRESENTATION

(71) Applicant: Crestron Electronics, Inc., Rockleigh, NJ (US)

(72) Inventor: Daniel Jackson, Valhalla, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 14/989,401

(22) Filed: Jan. 6, 2016

(65) Prior Publication Data

US 2016/0119656 A1    Apr. 28, 2016

Related U.S. Application Data

(60) Continuation of application No. 14/841,111, filed on Aug. 31, 2015, which is a division of application No. 14/461,046, filed on Aug. 15, 2014, now Pat. No. 9,342,992, which is a continuation of application No. 13/192,922, filed on Jul. 28, 2011, now Pat. No. 8,848,054.

(60) Provisional application No. 61/368,838, filed on Jul. 29, 2010.

(51) Int. Cl.
```
H04N 21/2368    (2011.01)
G09B 5/06       (2006.01)
G09B 5/10       (2006.01)
H04N 5/272      (2006.01)
```
(Continued)

(52) U.S. Cl.
CPC .............. *G09B 5/06* (2013.01); *G09B 5/065* (2013.01); *G09B 5/10* (2013.01); *H04N 5/272* (2013.01); *H04N 7/181* (2013.01); *H04N 21/2187* (2013.01); *H04N 21/2368* (2013.01); *H04N 21/4223* (2013.01); *H04N 21/42203* (2013.01); *H04N 21/437* (2013.01); *H04N 21/4334* (2013.01); *H04N 21/43635* (2013.01); *H04N 21/44016* (2013.01)

(58) Field of Classification Search
CPC ..................... H04N 21/2368; H04N 21/2187; H04N 5/272; H04N 7/181; H04N 21/42203; H04N 21/4223; H04N 21/4334; H04N 21/43635; H04N 21/437; H04N 21/44016; G09B 5/065; G09B 5/06; G09B 5/10
See application file for complete search history.

(56) References Cited

U.S. PATENT DOCUMENTS 6,035,341 A * 3/2000 Nunally ........... G08B 13/19645
                                              348/E5.099
6,343,313 B1 * 1/2002 Salesky ................. G06F 3/1415
                                                    709/203

(Continued)

*Primary Examiner* — Jayanti K Patel
*Assistant Examiner* — Joseph Suh
(74) *Attorney, Agent, or Firm* — Crestron Electronics, Inc

(57) ABSTRACT

A device and method for simultaneously capturing a content video stream comprising video of content presented during a live presentation, a content audio stream comprising audio accompanying the presented content, a presenter video stream comprising video of the presenter recorded via a video camera, and a presenter audio stream comprising audio of the presenter recorded via a microphone. The content audio stream and the presenter audio stream are mixed into a combined content and presenter audio stream, the content video stream is combined with the presenter video stream into a combined content and presenter video stream, and the combined content and presenter audio stream and the combined content and presenter video stream are encoded into a combined AV data stream. The combined AV data stream is distributed via one or more output channels, for example to a digital sink via an HDMI connection.

25 Claims, 11 Drawing Sheets

(51) Int. Cl.
  *H04N 7/18* (2006.01)
  *H04N 21/422* (2011.01)
  *H04N 21/4223* (2011.01)
  *H04N 21/433* (2011.01)
  *H04N 21/4363* (2011.01)
  *H04N 21/437* (2011.01)
  *H04N 21/44* (2011.01)
  *H04N 21/2187* (2011.01)

(56) References Cited

U.S. PATENT DOCUMENTS

| | | | | |
|---|---|---|---|---|
| 6,346,927 | B1* | 2/2002 | Tran | G09G 5/006 345/1.1 |
| 6,411,796 | B1* | 6/2002 | Remschel | G09B 5/10 434/118 |
| 6,490,009 | B1* | 12/2002 | Asakura | H04N 5/44 348/705 |
| 6,522,419 | B1* | 2/2003 | Ko | G06F 17/30017 358/1.1 |
| 6,661,422 | B1* | 12/2003 | Valmiki | G06T 9/007 345/530 |
| 8,151,179 | B1* | 4/2012 | Raman | G06F 17/30017 715/201 |
| 2001/0044855 | A1* | 11/2001 | Vermeire | H04L 29/06 719/310 |
| 2001/0052126 | A1* | 12/2001 | Nanki | H04N 5/44543 725/55 |
| 2002/0085461 | A1* | 7/2002 | Sugiyama | G11B 20/00188 369/47.12 |
| 2002/0118948 | A1* | 8/2002 | Jones | G11B 23/40 386/352 |
| 2002/0197593 | A1* | 12/2002 | Sutton | G09B 5/00 434/276 |
| 2003/0018897 | A1* | 1/2003 | Bellis, Jr. | G06Q 20/341 713/182 |
| 2003/0066080 | A1* | 4/2003 | Kamieniecki | H04N 5/44513 725/80 |
| 2003/0106064 | A1* | 6/2003 | Plourde, Jr. | H04N 5/76 725/91 |
| 2003/0142232 | A1* | 7/2003 | Albean | G11B 27/10 348/512 |
| 2003/0159143 | A1* | 8/2003 | Chan | H04N 5/45 725/41 |
| 2003/0184679 | A1* | 10/2003 | Meehan | H04N 5/76 348/565 |
| 2004/0016802 | A1* | 1/2004 | Cummings | G07C 13/00 235/386 |
| 2004/0131276 | A1* | 7/2004 | Hudson | H04N 5/44504 382/276 |
| 2004/0150748 | A1* | 8/2004 | Phillips | G08B 27/005 348/565 |
| 2005/0060537 | A1* | 3/2005 | Stamos | G06F 21/552 713/156 |
| 2006/0197880 | A1* | 9/2006 | Tomonaga | H04N 5/04 348/729 |
| 2006/0238826 | A1* | 10/2006 | Itou | H04N 21/6125 358/448 |
| 2007/0041278 | A1* | 2/2007 | Tsujimoto | H04N 5/775 369/1 |
| 2007/0083903 | A1* | 4/2007 | Wan | G06F 1/32 725/100 |
| 2007/0143576 | A1* | 6/2007 | Ellgen | H04N 5/268 712/10 |
| 2007/0166691 | A1* | 7/2007 | Epstein | G09B 7/00 434/365 |
| 2007/0180062 | A1* | 8/2007 | Southerland | H04N 21/2187 709/219 |
| 2007/0186015 | A1* | 8/2007 | Taft | G09G 5/006 710/16 |
| 2007/0195159 | A1* | 8/2007 | Packer | H04N 7/147 348/14.12 |
| 2007/0285364 | A1* | 12/2007 | Nakagawa | H04N 5/44591 345/87 |
| 2008/0030621 | A1* | 2/2008 | Ciudad | H04N 7/147 348/586 |
| 2008/0126943 | A1* | 5/2008 | Parasnis | G06Q 10/10 715/730 |
| 2008/0180519 | A1* | 7/2008 | Cok | H04N 7/15 348/14.02 |
| 2009/0051765 | A1* | 2/2009 | Moberly | H04N 7/181 348/77 |
| 2009/0231474 | A1* | 9/2009 | Ludwig | H04N 7/14 348/252 |
| 2010/0014692 | A1* | 1/2010 | Schreiner | H04S 3/008 381/119 |
| 2011/0010623 | A1* | 1/2011 | Vanslette | G06F 3/0485 715/704 |
| 2011/0131496 | A1* | 6/2011 | Abram | G11B 27/034 715/722 |
| 2012/0026327 | A1* | 2/2012 | Jackson | G09B 5/065 348/143 |
| 2013/0021524 | A1* | 1/2013 | Tang | G06F 3/1446 348/469 |
| 2013/0336628 | A1* | 12/2013 | Lamb | H04N 9/79 386/224 |

* cited by examiner

PRESENTATION CAPTURE DEVICE AND METHOD FOR SIMULTANEOUSLY CAPTURING MEDIA OF A LIVE PRESENTATION

BACKGROUND OF THE INVENTION

1. Technical Field

The present invention relates to presentation capture and more specifically to devices for capturing media information from a presentation.

2. Background Art

There is currently a drive toward expanding the traditional classroom into online education. Students of the digital age, having grown up with on demand media of all kinds, have an expectation that classroom lectures and notes be similarly available on demand. Additionally, more and more students are enrolling in distance education programs or internet based courses which require remotely available lectures and class materials. Lecture capture, also known as presentation capture, is a major focus of this expansion.

Lecture capture involves the recordation and publishing of classroom lectures and related media. While current solutions are available, there are continuing efforts to improve their form and functionality. For example, an accurate re-creation of the in-class environment is tantamount for students to get any use out of a captured lecture. Poor audio and video quality may be incomprehensible to a remote viewer. Even marginally inferior reproduction can dissuade a student from viewing a recorded lecture. Given this, capturing high quality content is extremely important and modern media and transmission formats need to be supported.

In addition, more flexibility is desired in presentation capture systems. Lecture halls and classrooms are not all created equal and do not all share the same uniform resources. For example, some large lecture halls are equipped with modern equipment such as digital video players and laptops, while others may contain more traditional equipment such as microphones and VCRs. Additionally, lecturers and presenters have individual preferences as to what resources they employ during a lecture. Some professors may believe in the educational power of the Powerpoint® presentation, whereas law professors rely strictly on the Socratic method and in-class dialogues. A presentation capture system is desired that is flexible enough for many different classroom environments and professor preferences.

However, while more flexibility in media capabilities is desired in presentation capture, users also require simple operation. Certain prior art solutions that employ increased functionality are often high-end systems that require a dedicated staff to deploy and maintain these systems. However, it is often the untrained professors that ultimately are the end users when recording individual lectures. As such, professors desire an automated lecture capture system that is simple enough for untrained personnel to use.

Given these concerns there is now a need for an improved lecture capture device. Such a device needs to be flexible regarding the inputs and outputs that it is capable of supporting. Additionally, the operation of such a device should be simple and require little to no training.

SUMMARY OF THE INVENTION

It is to be understood that both the general and detailed descriptions that follow are exemplary and explanatory only and are not restrictive of the invention.

DISCLOSURE OF INVENTION

Principles of the invention provide devices and methods for capturing and distributing a multimedia presentation. For example, according to a first aspect, the present invention provides a presentation capture device for capturing a content audio stream, a content video stream, a presenter audio stream and a presenter video stream. The presentation capture device comprises an analog video input channel for receiving an analog video signal comprising the content video stream, a digital content input channel for receiving a digital video data stream comprising the content video stream or the content video stream and the content audio stream, an analog audio input channel for receiving an analog audio signal comprising the content audio stream, a microphone input channel for receiving an analog audio signal comprising the presenter audio stream, a capture output channel for transmitting a digital data stream comprising a combination of the content video stream, the content audio stream and the presenter audio stream, a digital content output channel for transmitting a digital data stream comprising a combination of the content video stream, the content audio stream and the presenter audio stream to a local sink. The presentation capture device is configured for simultaneously recording the content video stream, the content audio stream and the presenter audio stream and outputting the captured the content video stream, the content audio stream and the presenter audio stream as a digital data stream in a compressed AV format, and detecting the source of the content audio stream and the content video stream and automatically routing a predetermined combination of input channels to the digital content output channel.

According to a second aspect, the present invention provides a presentation capture device for capturing the content audio stream, the content video stream, the presenter audio stream and the presenter video stream. The presentation capture device comprises multiple input channels. An analog video input channel is configured for receiving an analog video signal comprising the content video stream and transmitting the analog video signal to a first video switch. A digital content input channel is configured for receiving a digital video data stream comprising the content video stream and a digital data stream comprising the content video stream and the content audio stream and transmitting the digital data stream to the first video switch. An analog audio input channel is configured for receiving an analog audio signal comprising the content audio stream and transmitting the analog audio signal to an audio switch. A microphone input channel is configured for receiving an analog audio signal comprising the presenter audio stream, processing the analog audio signal and transmitting the analog audio signal to an audio mixer. The presentation capture device comprises multiple output channels. A capture output channel is configured for transmitting a digital data stream comprising a combination of the content video stream, the content audio stream and the presenter audio stream and further comprises a codec for receiving the combination of the content video stream, the content audio stream and the presenter audio stream and combining the combination in a digital data stream in a compressed AV format. A digital content output channel is configured for transmitting a digital data stream comprising a combination of the content video stream, the content audio stream and the presenter audio stream to a local sink. The presentation capture device further comprises a first video switch configured for receiving the content video stream, determining the source of the content video stream, extracting the content audio stream from a digital data stream and transmitting to an audio switch, and automatically routing a predetermined input channel depending on the source of the content video stream. The analog video input channel and analog video output channel are automatically routed to the digital content output channel and the capture output channel when the presentation capture device detects that the digital content input channel is inactive. The digital content input channel and the analog audio input channel are automatically routed to the digital content output channel and the capture output channel when the presentation capture device detects that the digital content input channel is receiving a digital video data stream comprising the content video stream. The digital content input channel is routed to the digital content output channel and the capture output channel when the presentation capture device detects that the digital content input channel is receiving a digital data stream comprising the content video stream and the content audio stream. The presentation capture device further comprises an audio switch configured for receiving the content audio stream, determining the source of the content audio stream, and automatically routing a predetermined input channel to the digital content output channel and capture output channel according to the source of the content audio stream. The analog audio input channel is automatically routed to the digital content output channel and the capture output channel when the audio switch determines that the content audio stream is not received from the first video switch. The digital content input channel is automatically routed to the digital content output channel and the capture output channel when the audio switch determines that the content audio stream is received from the first video switch.

According to a third aspect, the present invention provides a method for simultaneously capturing and routing presentation media. The method comprises the steps of receiving the content video stream at a first video switch from either an analog video input channel or a digital content input channel; automatically determining if the digital content input channel is the source of the of the content video stream, automatically routing the analog video input channel to a second video switch and a codec if the digital content input channel is not the source of the content video stream, automatically routing the digital content input channel to the second video switch and the codec if the digital content input channel is the source of the content video stream, transmitting an output of the codec comprising the content video stream to a capture output channel and the second video switch; and routing either the output of the first video switch or the output of the codec to a display via a digital content output channel.

According to a fourth aspect, the present invention provides a method for switching input configuration of a presentation capture device. The method comprises the steps of receiving the content video stream from an analog video input channel at a first video switch, determining that the source of the content video stream is not a digital content input channel, automatically routing the analog video input channel to a codec and a digital content output channel, capturing the output of the codec comprising the content video stream and displaying the output of the digital content output channel, switch to receiving the content video stream from the digital content input channel at the first video switch, determining that the source of the content video stream is the digital content input channel, and automatically routing the digital content input channel to the codec and the digital content output channel.

The present invention seeks to overcome or at least ameliorate one or more of several problems, including but not limited to limiting user interaction when selecting the source of input content.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
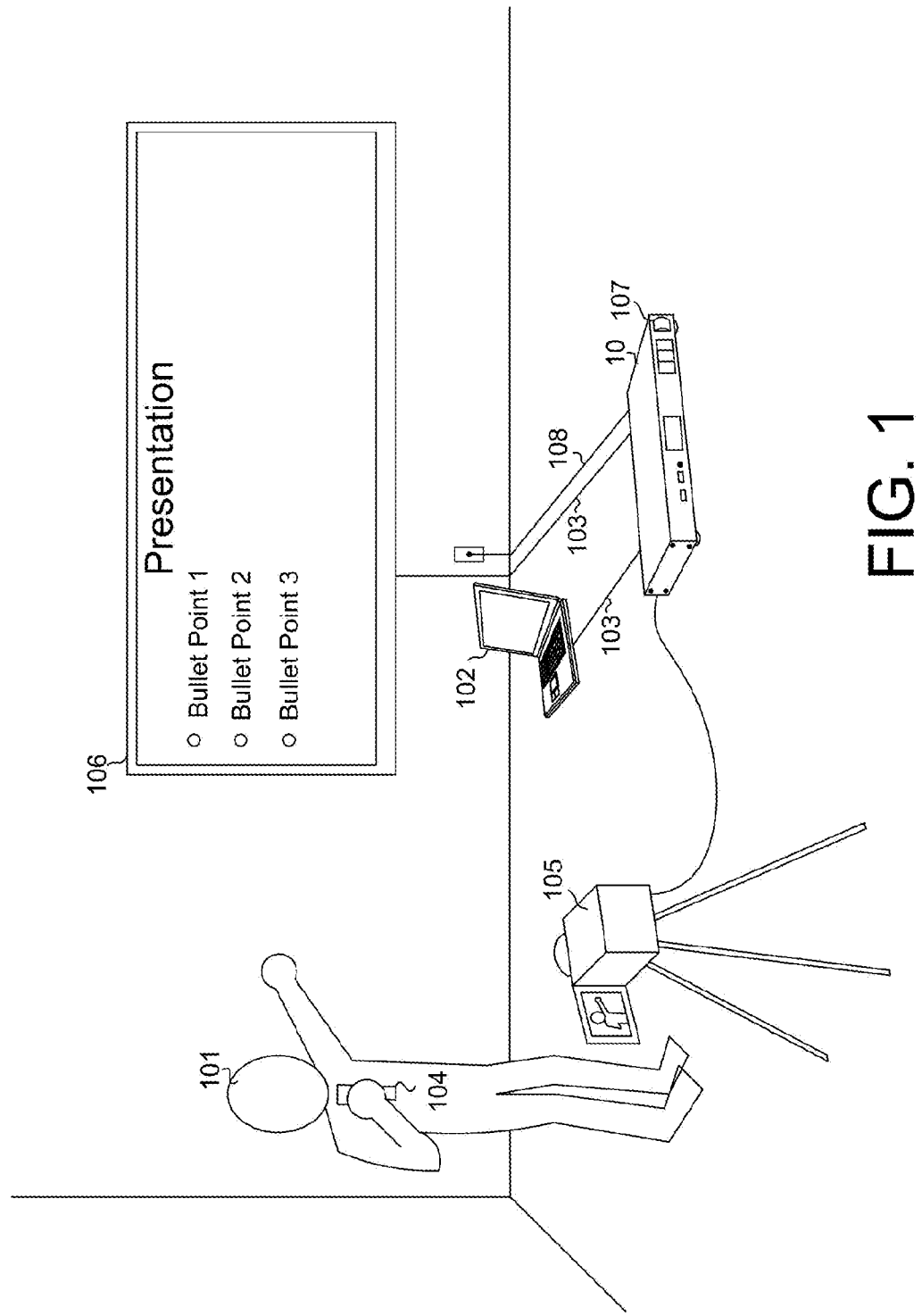

FIG. 1 shows an inventive presentation capture device capturing a presentation and routing content to a local data sink, according to an illustrative embodiment of the invention.

Figure 2:
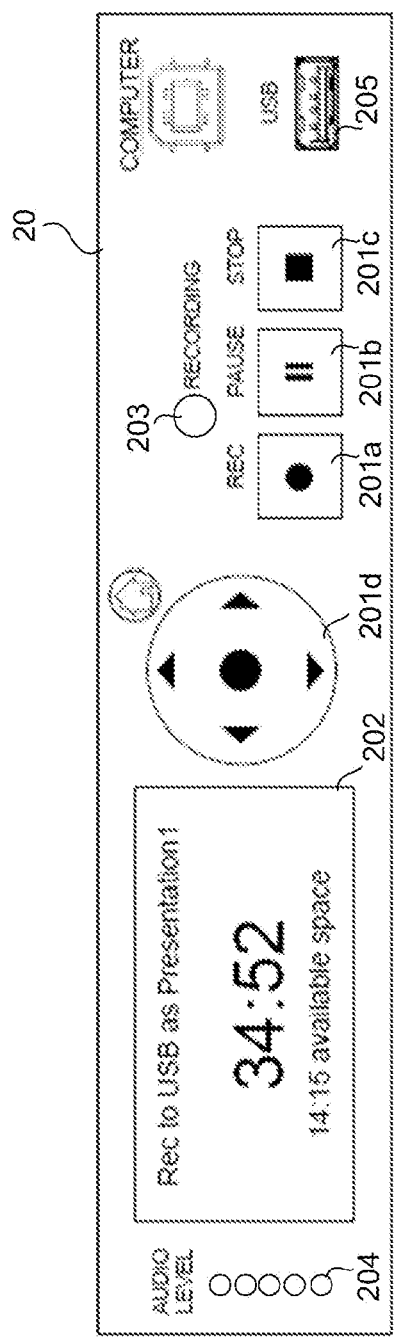

FIG. 2 shows the front panel of the inventive presentation capture device, according to an illustrative embodiment of the invention.

Figure 3:
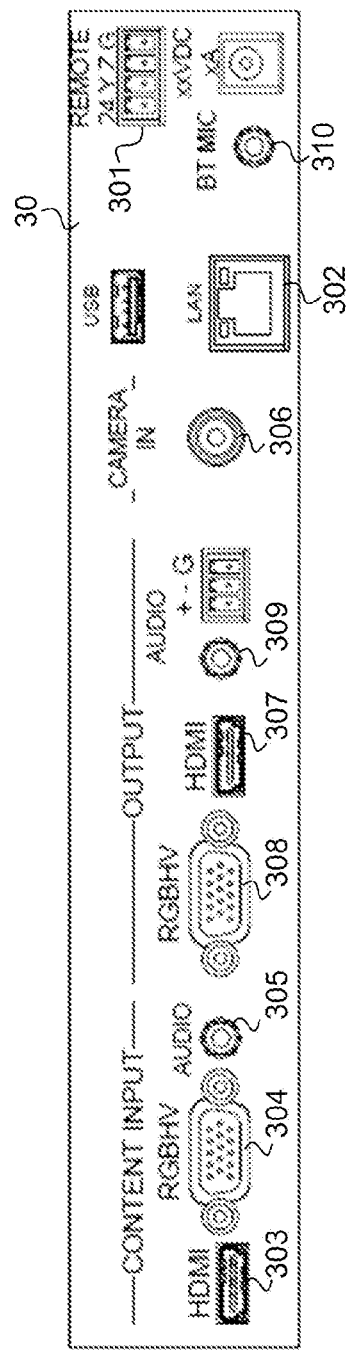

FIG. 3 shows the back panel of the inventive presentation capture device, according to an illustrative embodiment of the invention.

Figure 4:
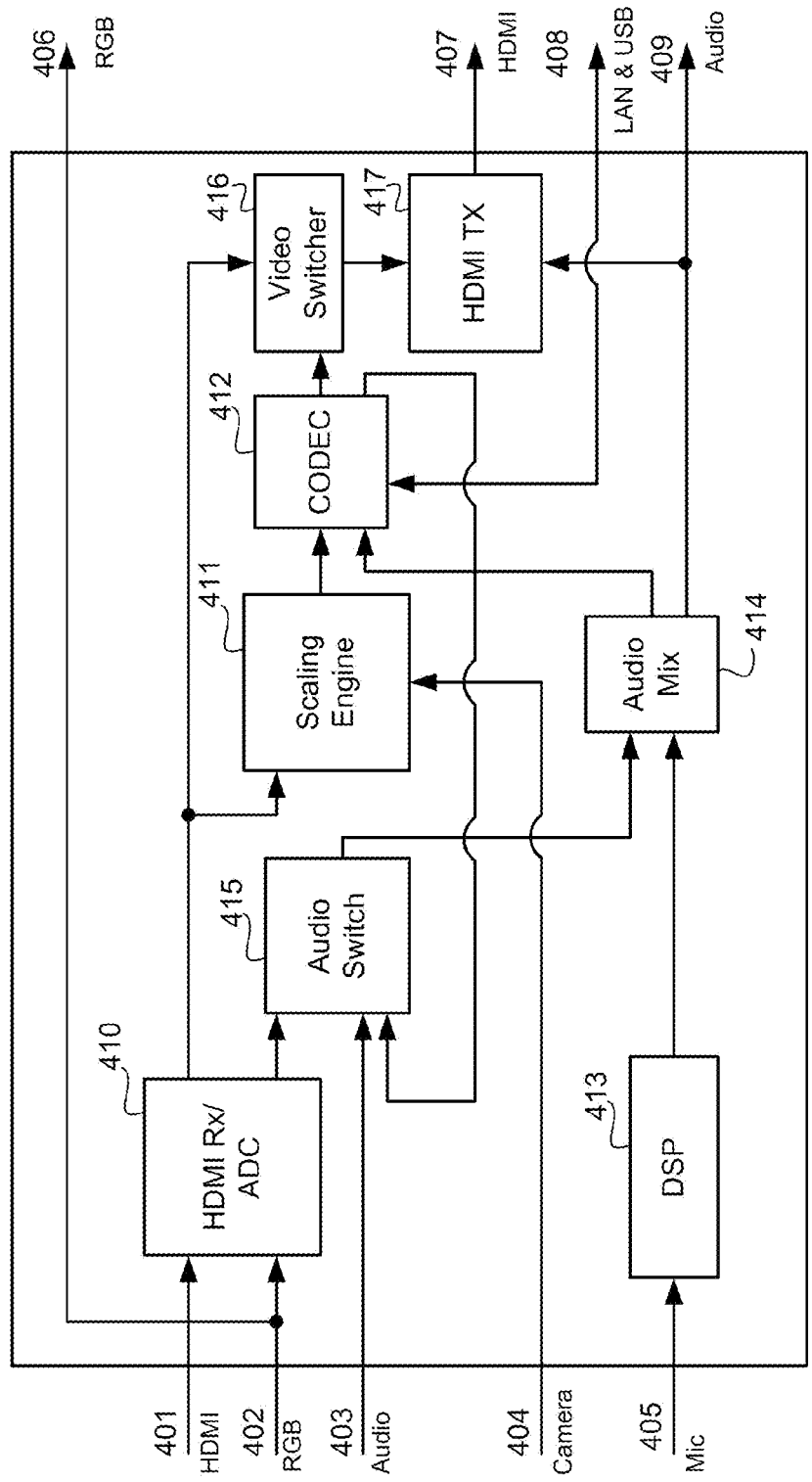

FIG. 4 is a functional block diagram of the inventive presentation capture device, according to an illustrative embodiment of the invention.

Figure 5:
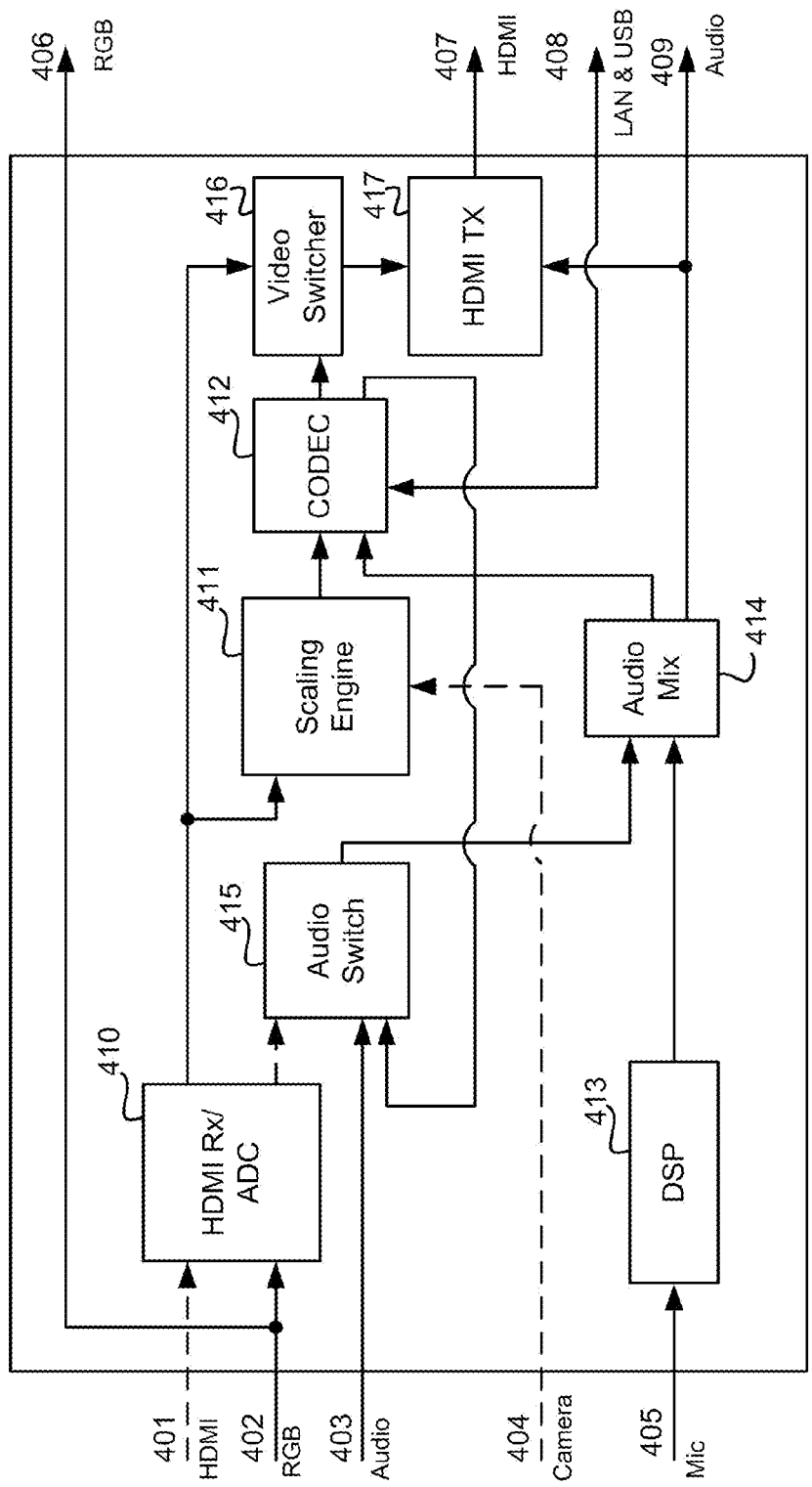

FIG. 5 is a functional block diagram of the inventive presentation capture device receiving an analog content video stream and an analog content audio stream, according to an illustrative embodiment of the invention.

Figure 6:
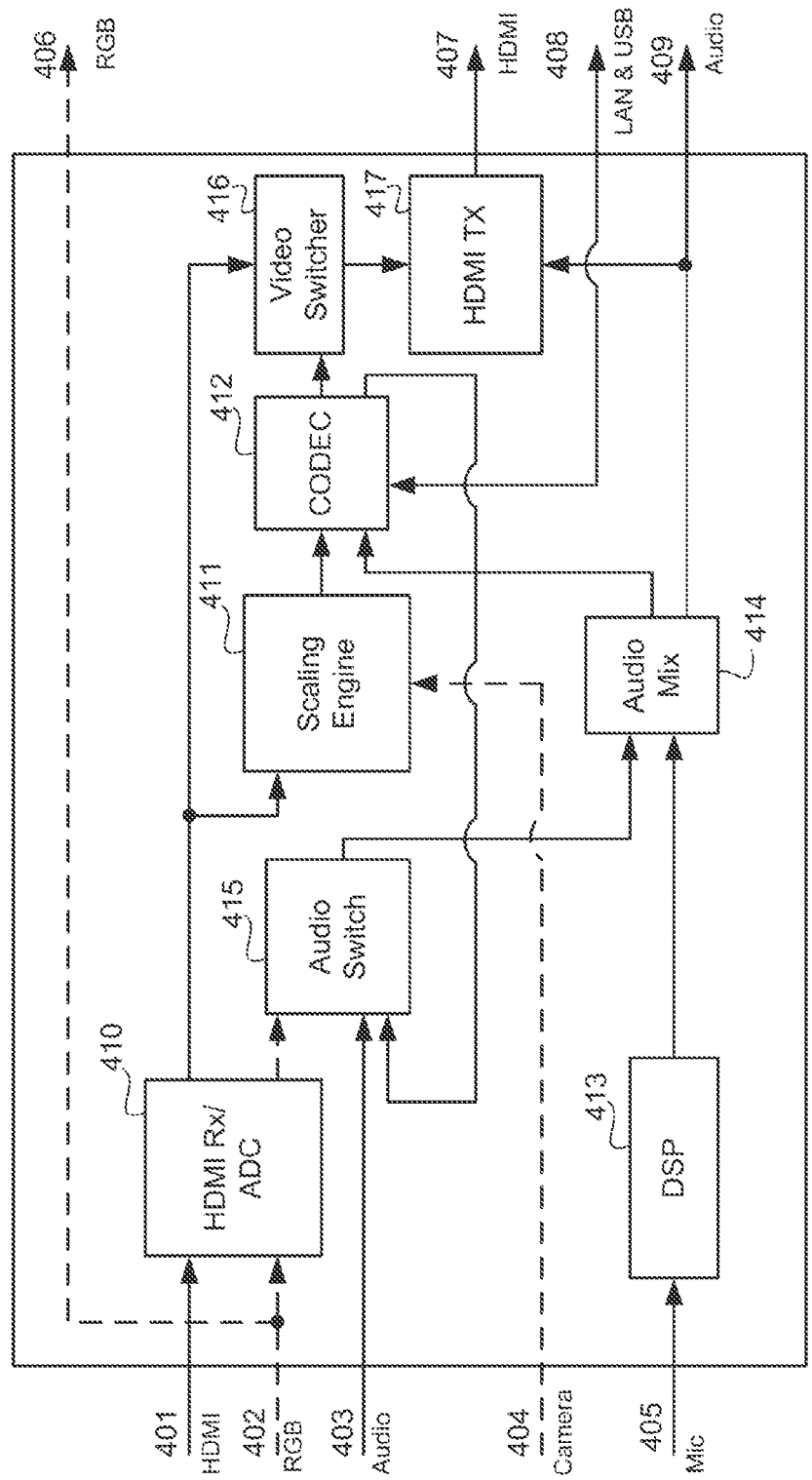

FIG. 6 is a functional block diagram of the inventive presentation capture device receiving a digital content video stream and an analog content audio stream, according to an illustrative embodiment of the invention.

Figure 7:
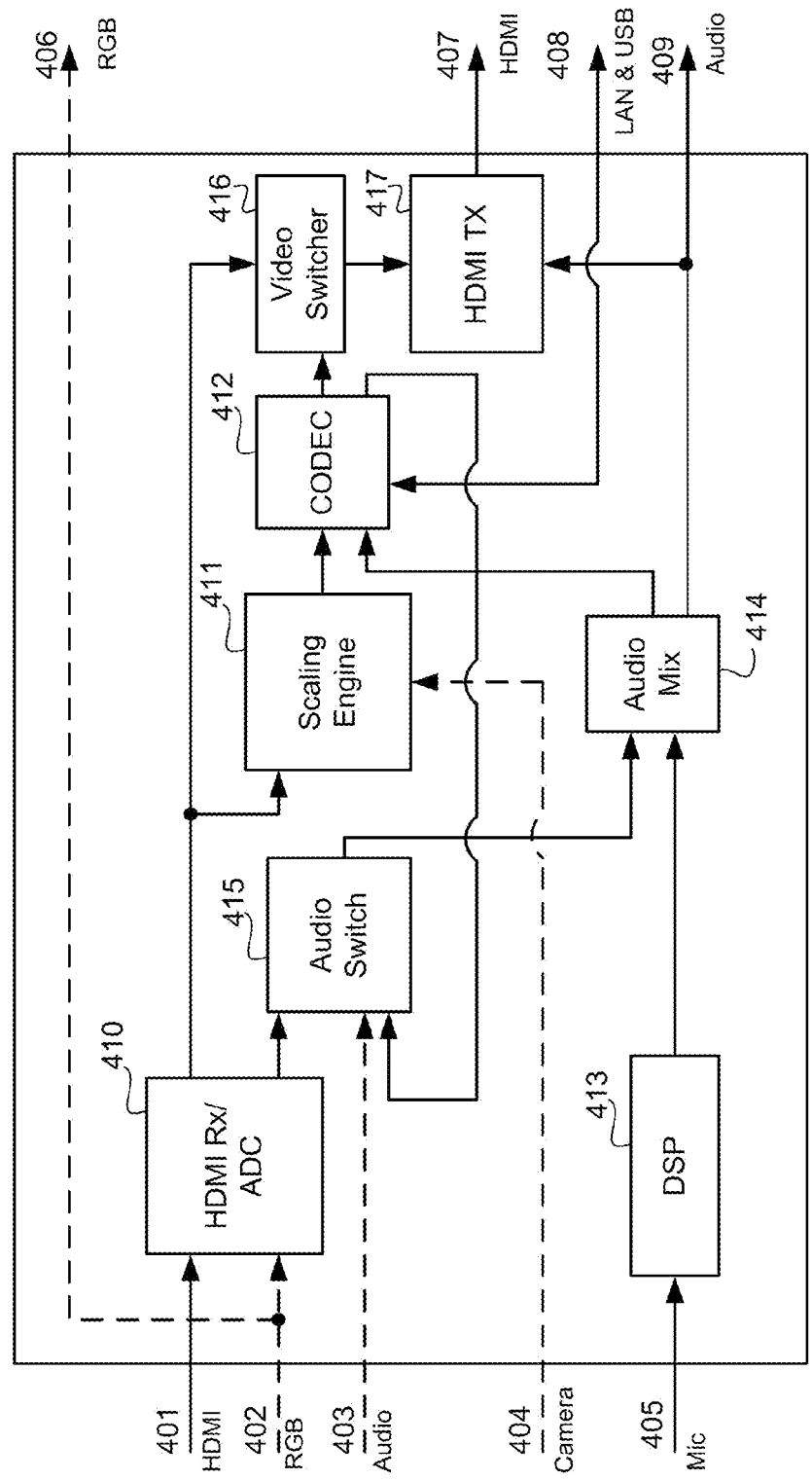

FIG. 7 is a functional block diagram of the inventive presentation capture device receiving a digital content video stream and a digital content audio stream, according to an illustrative embodiment of the invention.

Figure 8:
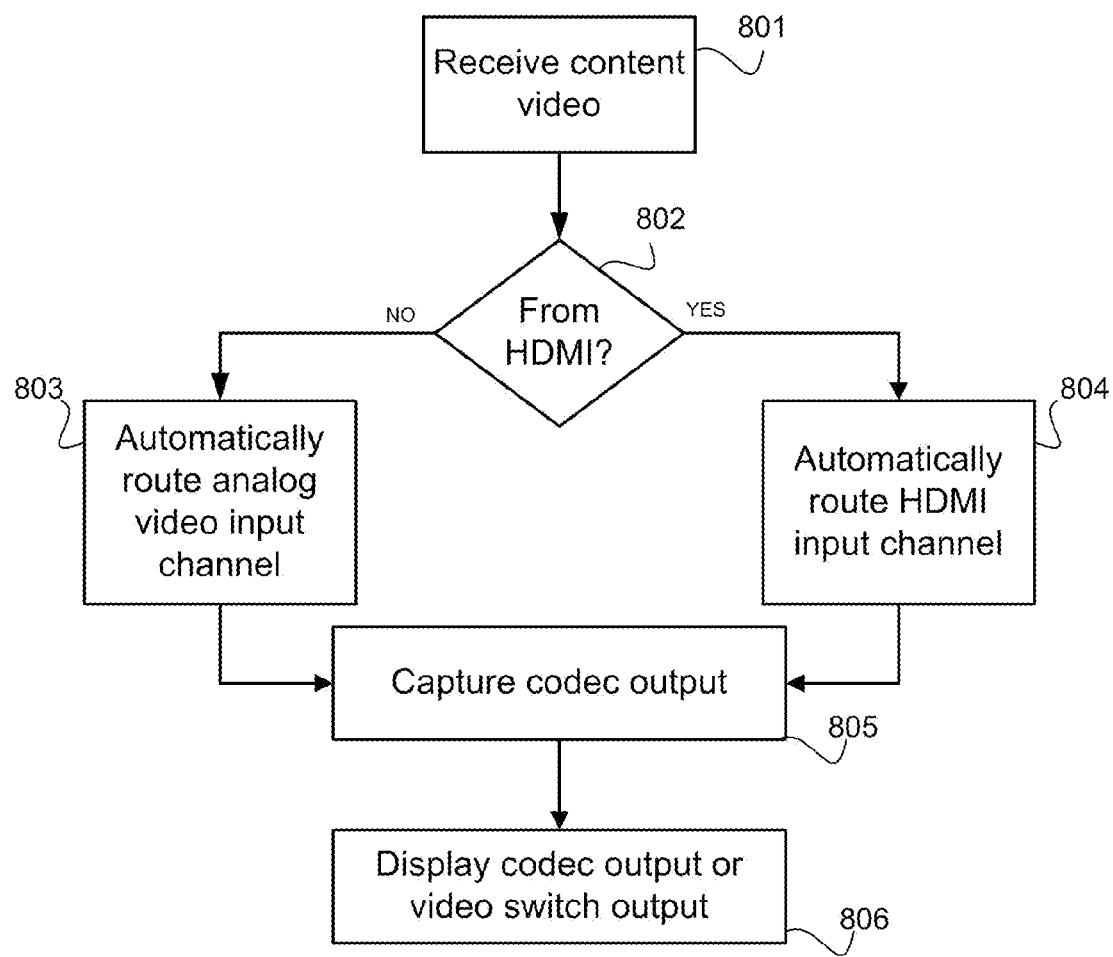

FIG. 8 is a flowchart illustrating a method for simultaneously capturing and routing presentation media, according to an illustrative embodiment of the invention.

Figure 9:
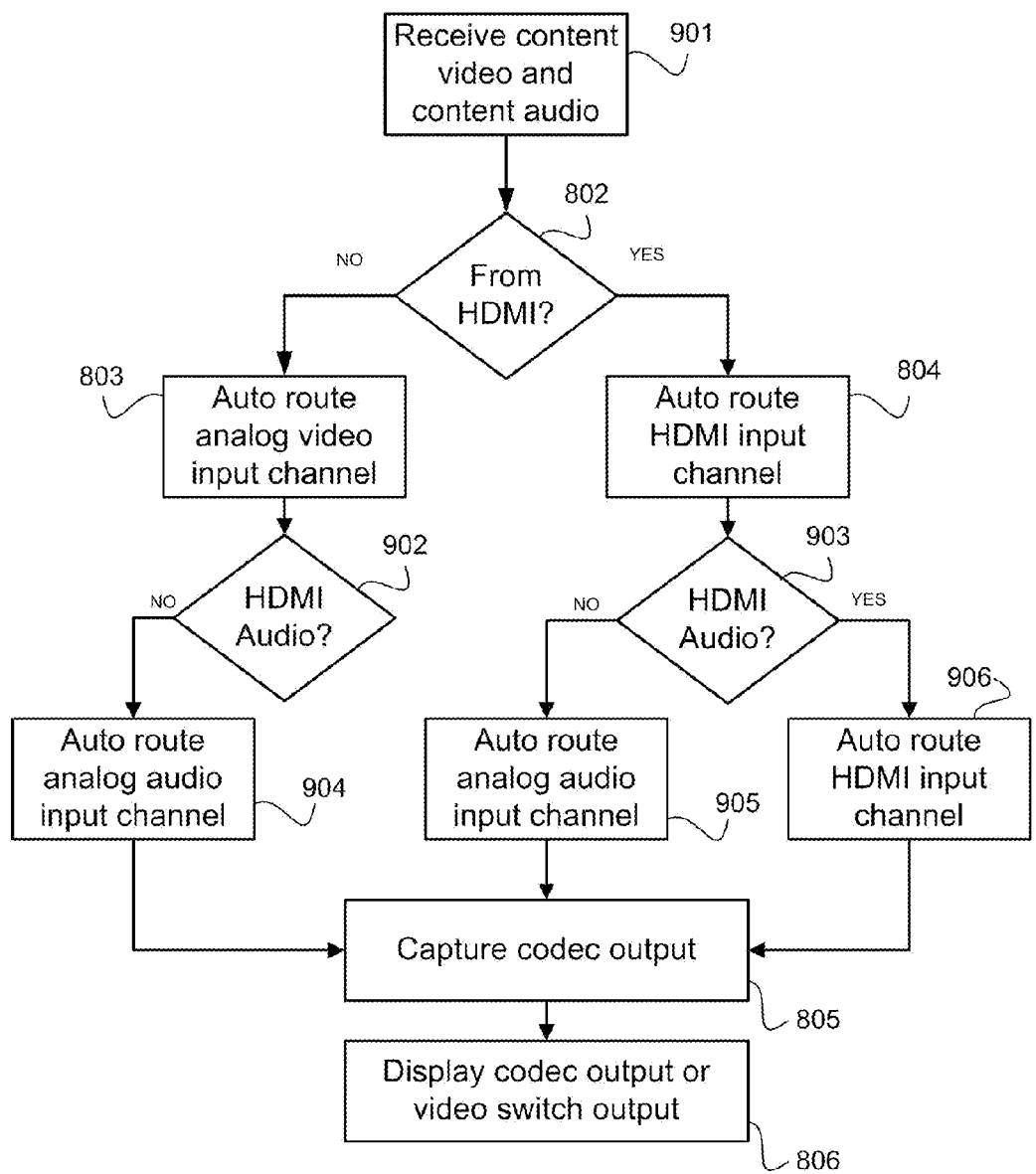

FIG. 9 is a flowchart illustrating additional steps for the method shown in FIG. 8, according to an illustrative embodiment of the invention.

Figure 10:
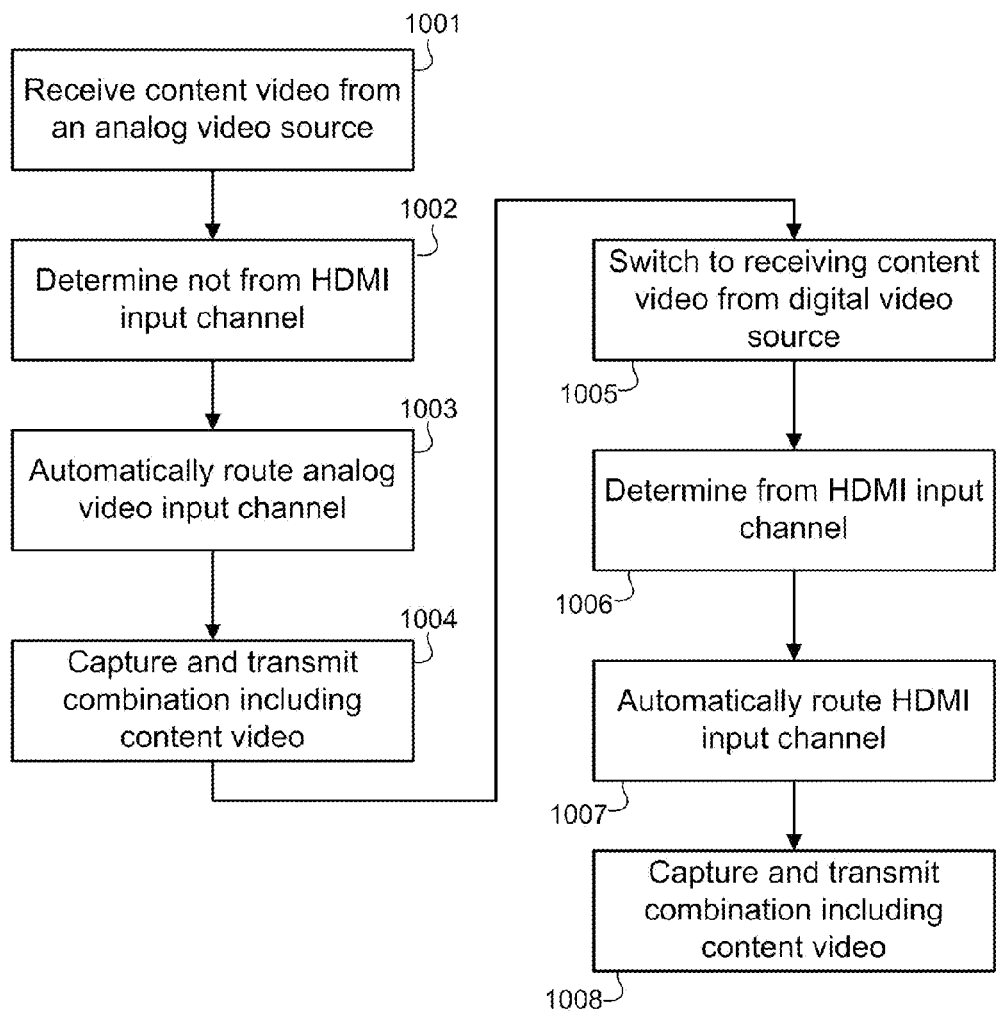

FIG. 10 is a flowchart illustrative a method for switching input configurations of a presentation capture device, according to an illustrative embodiment of the invention.

Figure 11:
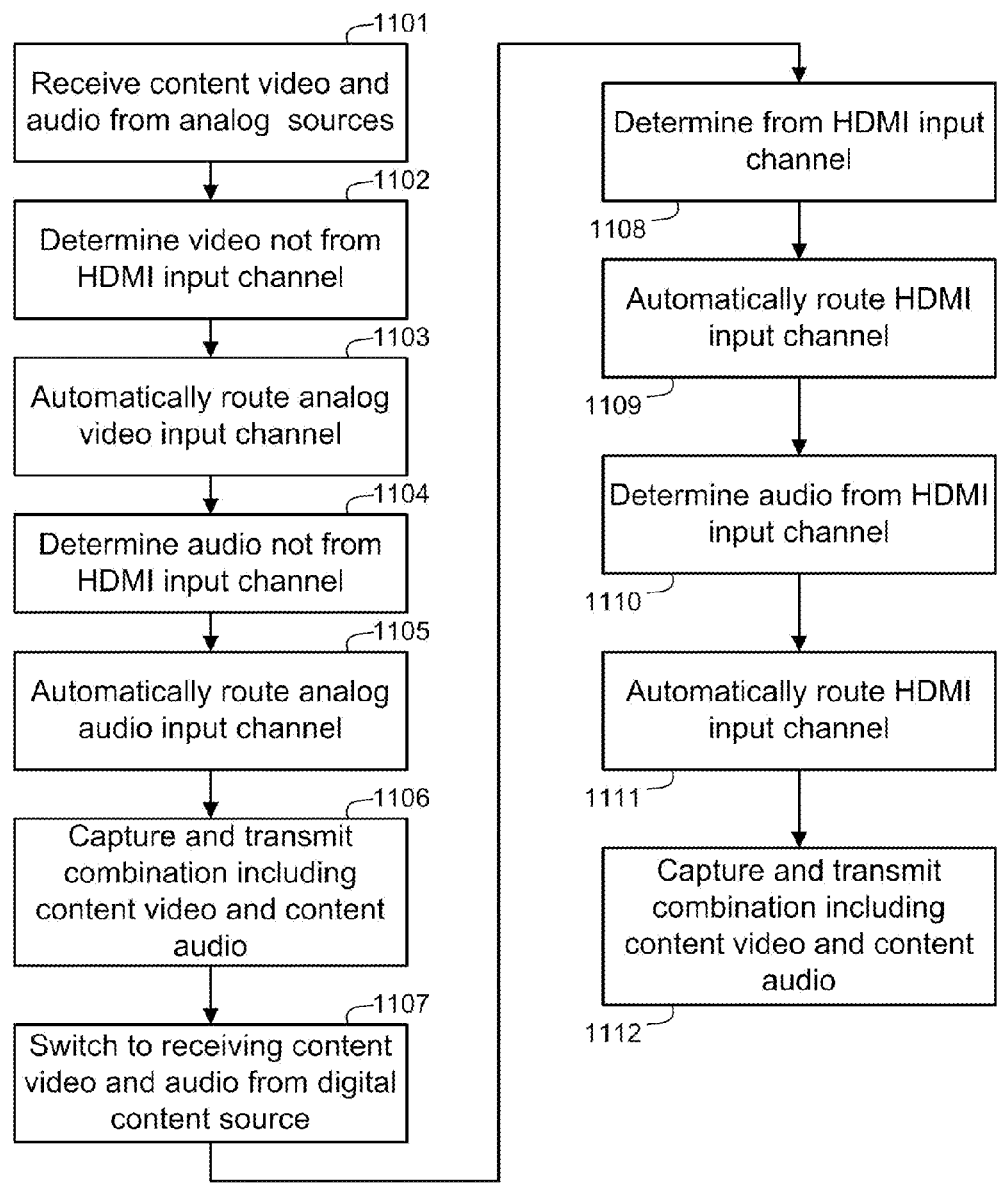

FIG. 11 is a flowchart illustrating additional steps for the method shown in FIG. 10, according to an illustrative embodiment of the invention.

LIST OF REFERENCE NUMBERS FOR THE MAJOR ELEMENTS IN THE DRAWING

The following is a list of the major elements in the drawings in numerical order.

10 presentation capture device
20 front panel (p/o presentation capture device 20)
30 back panel (p/o presentation capture device 30)
50 first configuration
60 second configuration
70 third configuration
101 lecturer
102 computer
103 High Definition Multimedia Interface (HDMI) connection
104 wireless microphone
105 video camera
106 digital sink
107 Universal Serial Bus (USB) memory stick
108 Ethernet connection
201a record button
201b pause button
201c stop button
201d navigational button
202 display
203 recording indicator LED
204 audio level indicator
205 USB output
301 remote control interface
302 network interface
303 digital content input
304 analog video input
305 audio input
306 camera input
307 digital content output
308 analog video output
309 audio output
310 microphone input
401 digital content input channel
402 analog video input channel
403 analog audio input channel
404 camera input channel
405 microphone input channel
406 analog video output channel
407 digital content output channel
408 capture output channel
409 analog audio output channel
410 first video switch
411 video processor
412 codec
413 digital signal processor
414 audio mixer
415 audio switch
416 second video switch
417 digital content transmitter
801 (step of) receiving the content video stream
802 (step of) determining source
803 (step of) automatically routing analog video input channel
804 (step of) automatically routing digital content input channel
805 (step of) capturing codec output
806 (step of) displaying codec output or second video switch output
901 (step of) receiving the content audio stream and the content video stream
902 (step of) determining source of the content audio stream
903 (step of) determining source of the content audio stream
904 (step of) automatically routing analog audio input channel
905 (step of) automatically routing analog audio input channel
906 (step of) automatically routing digital content input channel
1001 (step of) receiving the content video stream from analog video source
1002 (step of) determining video not from digital content input channel
1003 (step of) automatically routing analog video input channel
1004 (step of) capturing and transmitting combination including the content video stream
1005 (step of) switching to receiving the content video stream from digital video source
1006 (step of) determining video from digital content input channel
1007 (step of) automatically routing digital content input channel
1008 (step of) capturing and transmitting combination including the content video stream
1101 (step of) receiving the content video stream and the content audio stream from analog sources
1102 (step of) determining video not from digital content input channel
1103 (step of) automatically routing analog video input channel
1104 (step of) determining audio not from digital content input channel
1105 (step of) automatically routing analog audio input channel
1106 (step of) capturing and transmitting combination including the content video stream and the content audio stream
1107 (step of) switching to receiving the content video stream and the content audio stream from digital content source
1108 (step of) determining video from digital content input channel
1109 (step of) automatically routing digital content input channel
1110 (step of) determining audio from digital content input channel
1111 (step of) automatically routing digital content input channel
1112 (step of) capturing and transmitting combination including the content video stream and the content audio stream

DETAILED DESCRIPTION OF THE INVENTION

The present invention relates to presentation capture device for recording and distributing audio and video from one or more content sources and audio and video of a presenter. More particularly, the invention relates to a presentation capture device for capturing audio and video from content sources and a presenter as well as automatically detecting input source and distributing the content audio stream and video to a digital sink, accordingly.

FIG. 1 shows the inventive presentation capture device 10 in operation during a classroom lecture, according to an embodiment of the invention. The presentation capture device 10 is configured for simultaneously recording a content video stream, a content audio stream, a presenter video stream and a presenter audio stream from a presentation. While the inventive presentation capture device 10 is described throughout as capturing a lecture from a lecturer 101 in a classroom environment, a presentation may be any type of multimedia presentation. For example, the presentation capture device 10 may be capturing information from a corporate board meeting, a sales presentation or any other presentation that includes some combination of content audio stream, content video stream, presenter video stream, and presenter audio stream.

The content video stream and the content audio stream refer to audio visual (AV) media used by the presenter during the presentation and may be received as a digital signal or an analog signal. For example, the content video stream may be a power point slideshow received from a computer. The content audio stream may be audio accompanying the PowerPoint slideshow.

The presenter video stream and the presenter audio stream refer to AV media of the presenter or audience during the presentation. For example, the presenter audio stream may be the audio of a professor's lecture received from the presentation capture device from a wireless microphone. The presenter video stream may be video of the presenter recorded during the lecture. In another example, the presenter audio stream may also include questions asked by students in the audience of the lecture and the presenter video stream may include a video of the student asking the question.

The inventive presentation capture device 10 as shown in FIG. 1 is receiving the content video stream and the content audio stream from a digital content source, such as a computer 102, via a high-definition multimedia interface (HDMI) connection 103. Additionally, the presentation capture device is receiving audio from and video of the lecturer 101 via a wireless microphone 104 and a video camera 105, respectively.

The presentation capture device 10 is configured to simultaneously record the content video stream, the content audio stream, the presenter audio stream and the presenter video stream to a compressed audio-visual format. The presentation capture device 10 mixes the content audio stream and the presenter audio stream and combines the presenter video stream and the content video stream, such as by positioning the presenter video stream as a picture-by-picture (PBP) window or a picture-in-picture (PIP) window.

The presentation capture device 10 combines the audio and video as a compressed AV stream and outputs the compressed AV stream for capture (stored locally and uploaded to a server for archiving and on demand playback) or live streaming (transmitted as an AV stream over Ethernet 108). For example, the presentation capture device 10 may output the compressed AV stream for storage on a USB memory stick 107 which the lecturer may take with him. Alternatively, the presentation capture device 10 may transmit the compressed AV stream on a network for remote storage. Additionally, the presentation capture device 10 may output the compressed AV stream to a media server for live streaming over a network.

Additionally, the presentation capture device 10 processes and distributes a combination of the content audio stream, the content video stream, the presenter audio stream, and the presenter video stream to a digital sink 106 for display during the lecture. For example, the presentation capture device 10 may transmit the content audio stream and the content video stream to a television with embedded speakers. The presentation capture device 10 may also transmit combined video of the content video stream and the presenter video stream as well as combined audio of the content audio stream and the presenter audio stream to a digital sink 106. Advantageously, the presentation capture device 10 is configured to detect the source type of the incoming content audio stream and content video stream and automatically distribute the appropriate sources to a digital sink without requiring user interaction with the device, such as selecting a source.

FIG. 2 shows a front panel 20 of the inventive presentation capture device 10, according to an illustrative embodiment of the invention. The presentation capture device 10 may be operated with control buttons disposed on the front panel 20. For example, the front panel 20 comprises a record button 201a, a pause button 201b, a stop button 201c, and a navigational button 201d. The front panel 20 further comprises a color display 202 for displaying information such as a runtime status and control and setup menus, as well as feedback components such as a recording indicator LED 203 and an audio level indicator 204 for providing immediate feedback as to the recording status of the device.

A USB output 205 is disposed on the front panel 20 of the inventive presentation capture device for receiving a USB memory stick. The presentation capture device outputs the combination of the content audio stream, the content video stream, the presenter audio stream and the presenter video stream to the USB memory stick via USB output. Advantageously, the lecturer is provided with a recording of the captured lecture on the USB memory stick when the lecture has ended.

FIG. 3 shows a back panel 30 of the inventive presentation capture device 10, according to an illustrative embodiment of the invention. The presentation capture device 10 further comprises a remote control interface 301 for communicating with a remote control device. In addition to the control buttons disposed on the front panel 20, the inventive lecture capture device is configured to be controlled by a remote control. For example, the remote control device may be a TPS-6 Isys touchpanel or a TPMC-4SM touchpanel that are available from Crestron Electronics, Inc. of Rockleigh N.J.

The back panel 30 also comprises a network interface 302 for communicating on a network. The presentation capture device 10 is configured to transmit and receive information from a network, such as a local area network (LAN) or the world wide web, via network interface 302. Advantageously, the presentation capture device 10 may be remotely controlled from a computer on the network executing a software program as either a locally stored program or in an internet browser. The software may be Roomview software that is available from Crestron Electronics, Inc. of Rockleigh N.J. Additionally, the presentation capture device 10 may send information to the network. For example, the presentation capture device 10 may transmit the compressed AV stream of the captured lecture for storage or streaming on the network and may also transmit status information to the network.

The back panel 30 further comprises multiple inputs for receiving video and audio. A digital content input 303 is configured for receiving a cable from a digital content source transmitting digital content video stream and digital content audio stream as a digital data stream. For example, the digital content input may an HDMI input, a DisplayPort input, or a DVI input.

An analog video input 304 is configured for receiving a cable from an analog video source transmitting analog content video stream. For example, the analog video input 304 may be a red-green-blue-horizontal sync-vertical sync (RGBHV) input port configured for receiving an analog component video signal comprising video in RGBHV, RGBs, RGsB, or YUV format.

An audio input 305 is configured to receive a cable from an analog audio source transmitting analog content audio stream. For example, the audio input 305 may be an audio jack configured to receive two channels of analog audio.

A camera input 306 is configured to receive a cable from a camera source, such as a video camera, transmitting the presenter video stream. For example, the camera input may be an RCA jack configured for receiving composite video from a video camera.

A microphone input 310 is configured to receive an input connector from a microphone transmitting the presenter audio stream. For example, the microphone input 310 may be a TRS connector port configured to receive a TRS connector jack from a microphone. In another embodiment the TRS connector jack may receive audio from a wireless microphone receiver. The wireless microphone receiver may comprise an RF transceiver for receiving a digital RF signal from a wireless microphone 104 comprising the content audio stream and transmitting a corresponding analog audio signal received via TRS connector jack.

The back panel 30 further comprises multiple outputs for transmitting video and audio. A digital content output 307 is configured for receiving a cable for transmitting the content video stream and the content audio stream as a digital data stream to a digital content sink, such as over an HDMI connection, DVI connection, or DisplayPort connection. For example, the digital content output 307 may be transmitting digital video and digital audio to a television with embedded speakers. Further, the presentation capture device 10 may transmit a combination of digital content video stream, digital presenter video stream, digital content audio stream, and digital presenter audio stream to a digital data sink via a digital content output, such as an HDMI connection.

An analog video output 308 is configured for receiving a cable for transmitting analog content video stream to an analog video sink. For example, the analog video output 308 may be a red-green-blue-horizontal sync-vertical sync (RGBHV) output port configured for transmitting an analog component video signal comprising the content video stream in RGBHV, RGBs, RGsB, or YUV format.

An analog audio output 309 is configured to receive a cable for transmitting both presenter and content analog audio to an analog audio sink. For example, the audio output 309 may be an audio jack configured to transmit the presenter audio stream to a speaker via a speaker cable.

FIG. 4 is a functional block diagram of the inventive presentation capture device 10 according to an embodiment of the invention. The presentation capture device 10 comprises a digital content input channel 401, an analog video input channel 402, an analog audio input channel 403, a camera input channel 404 and a microphone input channel 405. The presentation capture device 10 further comprises an analog video output channel 406, a digital content output channel 407, and an analog audio output channel 409.

The presentation capture device 10 is configured to capture a presentation by simultaneously recording a combination of the content video stream, the content audio stream, and the presenter audio stream. The presentation capture device 10 receives the content video stream through the digital content input channel 401 or the analog video input channel 402. Both the digital content input channel 401 and the analog video input channel 402 transmit the content video stream to a first video switch 410. The first video switch 410 is configured to convert analog video to digital video if received from the analog video input channel and transmit the content video stream from either input channel to a video processor 411. The video processor 411 is configured to scale the content video stream according to requirements of the compressed AV format that will be recorded or streamed. The video processor 411 is configured to transmit the content video stream to a codec 412 for further processing.

The presentation capture device 10 receives the presenter audio stream at the microphone input channel 405. The presenter audio stream is processed at a digital signal processor 413 which is configured to process the audio and equalize the level. The presenter audio stream is transmitted to an audio mixer 414 which is configured to route audio to the codec 412 for further processing.

The presentation capture device 10 may also receive the content audio stream from the digital content input channel 401 or the analog audio input channel 403. The first video switch 410 is further configured for extracting the content audio stream from the content video stream received at the digital content input channel 401. An audio switch 415 is configured for receiving the content audio stream from the digital content input channel 401 and the analog audio input channel 403. The audio switch 415 routes the received content audio stream to the audio mixer 414. The audio mixer 414 is further configured to mix the content audio stream with the presenter audio stream and transmit the combined presenter and the content audio stream to the codec 412.

In a further embodiment, the presentation capture device 10 is configured to capture the presenter video stream and incorporate it as part of the captured lecture. A camera input channel 404 receives the presenter video stream from a camera source such as a video camera. The video processor 411 is further configured to receive the presenter video stream from the camera input channel 404 and convert it from analog to digital. The video processor 411 then combines the presenter video stream with the content video stream by either inserting it as a PIP window or as a PBP window. The combined video stream is transmitted to the codec 412.

The codec 412 is configured to receive a combination of the content video stream, the content audio stream, the presenter video stream and the presenter audio stream from the video processer and from the audio mixer. The codec 412 is configured to encode the combination of the content video stream, the content audio stream, the presenter video stream and the presenter audio stream in a compressed AV format as a digital data stream. The digital data stream from the codec 412 may be output to a capture output channel 408 such as a USB output 205 or a network interface 302.

The presentation capture device 10 is further configured to distribute a combination of the content video stream, the presenter video stream, the content audio stream, and the presenter audio stream to one or more local sinks via output channels. Specifically, the presentation capture device 10 further comprises a digital content output channel 407, digital content transmitter 417 and a second video switch 416. The second video switch 416 is configured for receiving an output from the first video switch 410 and an output from the codec 412. According to user preference, the second video switch 416 routes either of these outputs to the digital content transmitter 417. The digital content transmitter 417 is configured to receive video from the second video switch 416 and transmit said video to a digital sink via digital content output channel 407. Additionally, if the video received from the first video switch 410 is output from the first video switch 410 and not the codec 412, the digital content transmitter 417 may combine the audio from the audio mixer 414 to the digital data stream, according to user preference. Finally, the presentation capture device 10 may transmit the output of the codec 412 via digital content output channel 407. For example, the output of the codec 412 may be transmitted to a confidence monitor providing the lecturer with visual feedback of the combined video stream such as by allowing him to view whether he is in the field of view of the video camera or if a PIP window is blocking important underlying content.

Advantageously, the presentation capture device 10 is configured to automatically detect an input configuration of content sources and distribute an appropriate combination of the content video stream and the content audio stream to a digital content output channel 407 without user interaction. Specifically, the first video switch 410 is configured to automatically detect the input configuration by detecting a source type of the content video stream and route the corresponding input channel accordingly. Similarly the audio switch 415 is configured to detect whether it is receiving the content audio stream from the first video switch 410 and route the appropriate input channel.

The first video switch 410 may receive content in one of three configurations. Depending on the configuration, the first video switch 410 and audio switch 415 automatically route an optimal combination of input channels to the codec 412 (via video processor 411) and the digital content output channel 407 (via second video switch 416 and the digital content transmitter 417) without the user having to select the source.

FIG. 5 shows the presentation capture device configured in a first configuration, according to an illustrative embodiment of the invention. In the first configuration, the presentation capture device 10 is receiving analog content video stream from the analog video input channel 402 and the audio switch 415 is receiving analog content audio stream from the analog audio input channel 403. The first video switch 410 determines that the content video stream is not being received from the digital content input channel and converts the analog content video stream to digital and automatically routes the analog video input channel 402 to the video processor 411 and the second video switch 416 without the user having to select a video source. Additionally, the audio switch 415 determines that it is receiving the content audio stream from the audio input channel 403 and not extracted audio from the first video switch 410. The audio switch may make this determination by detecting a lack of audio packets in the digital stream. Accordingly, the audio switch 415 automatically routes the content audio stream to the audio mixer 414 without the user having to select an audio source.

FIG. 6 shows the presentation capture device configured in a second configuration, according to an illustrative embodiment. In the second configuration, the presentation capture device 10 is receiving digital content video stream via digital content input channel 401 and analog content audio stream via analog audio input channel 403. The first video switch 410 is configured to determine that the content video stream is received from the digital content input channel 401 and automatically routes the digital content input channel 401 to the video processor 411 and second video switch 416 without the user having to select a video source. Similarly, the audio switch 415 determines that it is receiving the content audio stream from the audio input channel 403 and not from the first video switch 410. The audio switch 415 may make this determination by detecting a lack of audio packets in the digital stream. Accordingly, the audio switch 415 automatically routes the analog audio input channel 403 to the audio mixer 414 without the user having to select an audio source.

FIG. 7 shows the presentation capture device configured in a third configuration, according to an illustrative embodiment of the invention. In the third configuration, the presentation capture is receiving digital content video stream and digital content audio stream from the digital content input channel 401. The first video switch 410 is configured to determine that it is receiving the content video stream and the content audio stream as a combined digital data stream from the digital content input channel 401. The first video switch 410 extracts the content audio stream from the combined digital data stream and automatically routes the digital content input channel 401 to the video processor 411 and codec 412. The audio switch 415 is configured to determine that it is receiving the content audio stream from the first video switch 410 and automatically routes the audio from the digital content input channel 401 to the audio mixer 414. The audio switch may make this determination by detecting presence of audio packets in the digital stream.

FIG. 8 is a flowchart illustrating a method for simultaneously capturing and routing presentation media, according to an illustrative embodiment of the invention. In step 801, the presentation capture device 10 receives the content video stream. In step 802, the first video switch 410 determines if the content video stream is received at a digital content input channel 401. If the content video stream is not received from the digital content input channel 401, in step 803, the first video switch 410 automatically routes the analog video input channel 402 to the second video switch 416 and the video processor 411 without the user having to select a video source. If the content video stream is received at the digital content input channel 401, in step 804, the first video switch 410 automatically routes the digital content input channel 401 to the second video switch 416 and the video processor 411. In step 805, the video processor 411 transmits a scaled video to the codec 412 for capture. In step 806, the second video switch 416 routes either the output from the first video switch 410 or the output of the codec 412 to the digital content transmitter 417 for output via digital content output channel 407.

FIG. 9 is a flowchart illustrating additional steps for the method shown in FIG. 8, according to an illustrative embodiment of the invention. In the method shown in FIG. 9, the presentation capture device 10 receives the content audio stream and the content video stream in step 901. If the first video switch 410 determines in step 802 that the content video stream is received from the analog input channel, the method proceeds to step 902, wherein the audio switch 415 determines whether the content audio stream is extracted by the first video switch 410 from a digital data stream. If the audio switch 415 determines that the content audio stream is not received from the first video switch 410, in step 904, the audio switch 415 automatically routes the analog audio input channel 403 to the codec 412 and the digital content output channel 407 via audio mixer 414 and digital content transmitter 417.

If the first video switch 410 determines in step 802 that the content video stream is received from the digital content input channel 401, the method proceeds to step 903, wherein the audio switch 415 determines whether the content audio stream has been extracted by the first video switch 410 from a digital data stream and transmitted to the audio switch by the video switch. If the audio switch 415 determines that the content audio stream is not received from the first video switch 410, in step 905, the audio switch 415 automatically routes the analog audio input channel 403 to the codec 412 and the digital content output channel 407 via audio mixer 414 and digital content transmitter 417. If the audio switch 415 determines that the content audio stream is received from the first video switch 410, in step 906, the audio switch 415 automatically routes the digital content input channel 401 to the codec 412 and the digital content output channel 407 via audio mixer 414 and digital content transmitter 417.

FIG. 10 is a flowchart illustrating a method for switching input configurations of a presentation capture device, according to an illustrative embodiment of the invention. In step 1001, the presentation capture device 10 receives the content video stream from an analog video source 402. In step 1002, the first video switch 410 determines that the content video stream is not being received from the digital content input channel 401. In step 1003, the analog video input channel 402 is automatically routed to the codec 412 and the digital content output channel 407 via video processor 411 and the second switch 416 and digital content transmitter 417, respectively. In step 1004, a combination of the content video stream, the content audio stream, the presenter video stream and the presenter audio stream is captured as an output of the codec 412 and transmitted via digital content output channel 407 as either an output of the codec 412 or an output of the second switch 416.

In step 1005, the presentation capture device 10 begins receiving the content video stream from a digital video source 401 instead. In step 1006, the first video switch 410 determines that the content video stream is being received from the digital content input channel 401. In step 1007, the digital content input channel 401 is automatically routed to the codec 412 and the digital content output channel 407 via video processor 411 and the second switch 416 and digital content transmitter 417, respectively. In step 1008, a combination of the content video stream, the content audio stream, the presenter video stream and the presenter audio stream is captured as an output of the codec 412 and transmitted via digital content output channel 407 as either an output of the codec 412 or an output of the second switch 416.

FIG. 11 is a flowchart illustrating additional steps for the method shown in FIG. 10, according to an illustrative embodiment of the invention. In step 1101, the presentation capture device 10 receives the content video stream and the content audio stream from an analog video source 402 and an analog audio source 403. In step 1102, the first video switch 410 determines that the content video stream is not being received from the digital content input channel 401. In step 1103, the analog video input channel 402 is automatically routed to the codec 412 and the digital content output channel 407 via video processor 411 and the second switch 416 and digital content transmitter 417, respectively. In step 1104, the audio switch 415 determines that the audio is not received from the first video switch 410. In step 1105, the analog audio input channel 403 is automatically routed to the codec 412 and the digital content transmitter 417 via audio mixer 414. In step 1106, a combination of the content video stream, the content audio stream, the presenter video stream and the presenter audio stream is captured as an output of the codec 412 and transmitted via digital content output channel 407 as either an output of the codec 412 or an output of the second switch 416 and the audio mixer 414.

In step 1107, the presentation capture device 10 begins receiving the content video stream and the content audio stream from a digital content source 401 instead. In step 1108, the first video switch 410 determines that the content video stream is being received from the digital content input channel 401. In step 1109, the digital content input channel 401 is automatically routed to the codec 412 and the digital content output channel 407 via video processor 411 and the second switch 416 and digital content transmitter 417, respectively. In step 1110, the audio switch 415 determines that the audio is being received from the first video switch 410. In step 1111, the digital content input channel 401 is automatically routed to the codec 412 and the digital content transmitter 417 via audio mixer 414. In step 1112, a combination of the content video stream, the content audio stream, the presenter video stream and the presenter audio stream is captured as an output of the codec 412 and transmitted via digital content output channel 407 as either an output of the codec 412 or an output of the second switch 416 and the audio mixer 414.

INDUSTRIAL APPLICABILITY

To solve the aforementioned problems, the present invention is a unique device configured for simultaneously capturing a combination of the content video stream, the content audio stream, the presenter video stream and the presenter audio stream is for storage or streaming as well as for distributing to a digital sink.

LIST OF ACRONYMS USED IN THE DETAILED DESCRIPTION OF THE INVENTION

The following is a list of the acronyms used in the specification in alphabetical order.
AV audio-visual
HDMI high-definition multimedia interface
LAN local area network
PBP picture-by-picture
PIP picture-in-picture
RF radio frequency
RGB red green blue
RGBHV red green blue horizontal sync vertical sync
USB universal serial bus

ALTERNATE EMBODIMENTS

Alternate embodiments may be devised without departing from the spirit or the scope of the invention. For example, the presentation capture device 10 could be equipped with an RF transceiver for communicating wirelessly with a network.

What is claimed is:

1. A method executed by a presentation capture device for simultaneously capturing a content audio stream, a content video stream, a presenter audio stream, and a presenter video stream of a live presentation, the method comprising the steps of:
receiving the content video stream from an AV content input channel, wherein the content video stream comprises a video of a content presented by a presenter during the live presentation;
receiving the content audio stream from one of (i) the AV content input channel and (ii) a content audio input channel, wherein the content audio stream comprises an audio accompanying the content presented by the presenter during the live presentation;
receiving the presenter video stream from a camera input channel, wherein the presenter video stream comprises a video of the presenter recorded via a video camera during the live presentation;

receiving the presenter audio stream from a microphone input channel, wherein the presenter audio stream comprises an audio of the presenter recorded via a microphone during the live presentation;

mixing the content audio stream and the presenter audio stream into a combined content and presenter audio stream;

combining the content video stream with the presenter video stream into a combined content and presenter video stream;

encoding the combined content and presenter audio stream and the combined content and presenter video stream into a combined AV data stream;

transmitting the combined AV data stream via one or more output channels;

recording the combined AV data stream on a universal serial bus (USB) storage device by transmitting the combined AV data stream via a universal serial bus (USB) interface to the universal serial bus (USB) storage device; and simultaneously transmitting the combined AV data stream via an HDMI interface to a local data sink comprising a display and speakers for display during said live presentation.

2. The method of claim 1, wherein the one or more output channels comprise the universal serial bus (USB) interface, a network interface, the HDMI interface, and an analog audio sink interface.

3. The method of claim 1 further comprising the step of:
simultaneously transmitting the combined AV data stream via a network interface to a network.

4. The method of claim 3 further comprising the step of:
transmitting the combined AV data stream on the network to a media server for on demand playback.

5. The method of claim 3 further comprising the step of:
transmitting the combined AV data stream on the network to a media server for live streaming.

6. The method of claim 1 further comprising the step of:
uploading the combined AV data stream on a network to a media server.

7. The method of claim 1, wherein the content video stream is combined with the presenter video stream for display in a picture-by-picture or a picture-in-picture configuration.

8. The method of claim 1, wherein the AV content input channel comprises an HDMI interface.

9. The method of claim 1 further comprising the step of:
switching to receive the content audio stream from one of the AV content input channel and the content audio input channel.

10. The method of claim 1 further comprising the step of:
scaling the content video stream and presenter video stream.

11. The method of claim 1 further comprising the step of:
equalizing the level of the presenter audio stream.

12. The method of claim 1, wherein the one or more output channels comprise the HDMI interface.

13. The method of claim 1 further comprising the step of:
receiving a control signal from a remote control via a remote control interface.

14. The method of claim 1 further comprising the step of:
receiving a control signal from a remote computer via a network interface, wherein the remote computer executes a software program in an internet browser to generate said control signal.

15. The method of claim 1, wherein the combined AV data stream is encoded in a compressed AV format.

16. The method of claim 1 wherein the combined AV data stream is transmitted to a confidence monitor viewed by the presenter.

17. The method of claim 1 further comprising the step of:
when receiving the content audio stream from the AV content input channel, extracting the content audio stream from a data stream comprising the content audio stream and the content video stream.

18. A method executed by a presentation capture device for simultaneously capturing a content audio stream, a content video stream, a presenter audio stream, and a presenter video stream of a live presentation, the method comprising the steps of:

switching to receive the content audio stream from one of an AV content input channel and a content audio input channel;

in response to the switching, receiving one of:
(i) a video data stream from the AV content input channel comprising the content video stream and an audio data stream from the content audio input channel comprising the content audio stream, and
(ii) a data stream from the AV content input channel comprising the content video stream and the content audio stream,
wherein the content video stream comprises a video of a content presented by a presenter during the live presentation and wherein the content audio stream comprises an audio accompanying the content presented by the presenter during the live presentation;

when receiving the content audio stream from the AV content input channel, extracting the content audio stream from the data stream comprising the content audio stream and the content video stream;

receiving the presenter video stream from a camera input channel, wherein the presenter video stream comprises a video of the presenter recorded via a video camera during the live presentation;

receiving the presenter audio stream from a microphone input channel, wherein the presenter audio stream comprises an audio of the presenter recorded via a microphone during the live presentation;

mixing the content audio stream and the presenter audio stream into a combined content and presenter audio stream;

combining the content video stream with the presenter video stream into a combined content and presenter video stream;

encoding the combined content and presenter audio stream and the combined content and presenter video stream into a combined AV data stream;

transmitting the combined AV data stream via one or more output channels;

recording the combined AV data stream on a universal serial bus (USB) storage device by transmitting the combined AV data stream via a universal serial bus (USB) interface to the universal serial bus (USB) storage device; and simultaneously transmitting the combined AV data stream via an HDMI interface to a local data sink comprising a display and speakers for display during said live presentation.

19. A presentation capture device for simultaneously capturing a content audio stream, a content video stream, a presenter audio stream, and a presenter video stream of a live presentation, the presentation capture device comprising:

an AV content input channel configured for receiving one of (i) a video data stream comprising the content video stream and (ii) a data stream comprising the content video stream and the content audio stream, wherein the content video stream comprises a video of a content presented by a presenter during the live presentation and wherein the content audio stream comprises an audio accompanying the content presented by the presenter during the live presentation;

a content audio input channel configured for receiving the content audio stream;

a camera input channel configured for receiving the presenter video stream, wherein the presenter video stream comprises a video of the presenter recorded via a video camera during the live presentation;

a microphone input channel configured for receiving the presenter audio stream, wherein the presenter audio stream comprises an audio of the presenter recorded via a microphone during the live presentation; and one or more output channels;

wherein the presentation capture device is configured for:
    mixing the content audio stream and the presenter audio stream into a combined content and presenter audio stream;
    combining the content video stream with the presenter video stream into a combined content and presenter video stream;
    encoding the combined content and presenter audio stream and the combined content and presenter video stream into a combined AV data stream; and
    transmitting the combined AV data stream via the one or more output channels;

wherein the one or more output channels comprise:
    a universal serial bus (USB) interface, wherein the presentation capture device is configured for recording the combined AV data stream on a universal serial bus (USB) storage device by transmitting the combined AV data stream via the universal serial bus (USB) interface to the universal serial bus (USB) storage device; and
    an HDMI interface configured for simultaneously transmitting the combined AV data stream to a local data sink comprising a display and speakers for display during said live presentation.

20. The presentation capture device of claim 19, wherein the one or more output channels further comprise:
    a network interface configured for simultaneously transmitting the AV data stream to a network.

21. The presentation capture device of claim 20, wherein the network interface is configured for transmitting the combined AV data stream on the network to a media server for on demand playback.

22. The presentation capture device of claim 20, wherein the network interface is configured for transmitting the combined AV data stream on the network to a media server for live streaming.

23. The presentation capture device of claim 19, wherein the content video stream is combined with the presenter video stream for display in a picture-by-picture or a picture-in-picture configuration.

24. The presentation capture device of claim 19 further comprising:
    an audio switch configured for switching to receive the content audio stream from one of the AV content input channel and the content audio input channel.

25. The presentation capture device of claim 19, wherein when the content audio stream is received from the AV content input channel, the presentation capture device is configured for extracting the content audio stream from the data stream comprising the content audio stream and the content video stream.

* * * * *